Dec. 19, 1950

L. A. KING 2,534,521

OSCILLATION GENERATOR

Filed Oct. 3, 1945

3 Sheets-Sheet 1

INVENTOR
LOUIS A. KING.
BY H. S. Grover
ATTORNEY

Dec. 19, 1950 L. A. KING 2,534,521

OSCILLATION GENERATOR

Filed Oct. 3, 1945 3 Sheets-Sheet 2

INVENTOR
Louis A. King.

BY H. S. Grover
ATTORNEY

Dec. 19, 1950 L. A. KING 2,534,521

OSCILLATION GENERATOR

Filed Oct. 3, 1945 3 Sheets-Sheet 3

INVENTOR
LOUIS A. KING.
BY H. S. Grover
ATTORNEY

Patented Dec. 19, 1950

2,534,521

UNITED STATES PATENT OFFICE 2,534,521

OSCILLATION GENERATOR

Louis A. King, Haddonfield, N. J., assignor to Radio Corporation of America, a corporation of Delaware Application October 3, 1945, Serial No. 620,152

17 Claims. (Cl. 250—36)

This invention relates to an electron discharge device oscillation generator circuit, and is particularly applicable to high power generator apparatus producing high frequency currents for industrial heating purposes.

An object of the present invention is to provide a radio frequency circuit which enables a vacuum tube to operate at full power output under high frequency conditions with a sufficiently high kv.-a. ratio to produce good oscillator stability.

Another object of the present invention is to provide a liquid cooled and relatively high power vacuum tube oscillator having substantially uniform radio frequency current distribution around the anode and grid electrode seals for minimizing heat stress in these seals.

A further object is to provide a novel mechanical construction for cooling the output electrode of a vacuum tube and its associated connections while permitting the cooling fluid to be applied to the connections at a point of minimum potential compared to the maximum potential available at the output electrode.

A still further object of the invention is to provide a vacuum tube oscillator capable of producing high frequency oscillations of the order of 27 megacycles at a power output of the order of 50 kilowatts and wherein the inductance of the connections between the circuit elements and the electrodes are an absolute minimum.

The following is a more detailed description of the invention accompanied by drawings, wherein.

Figure 1:
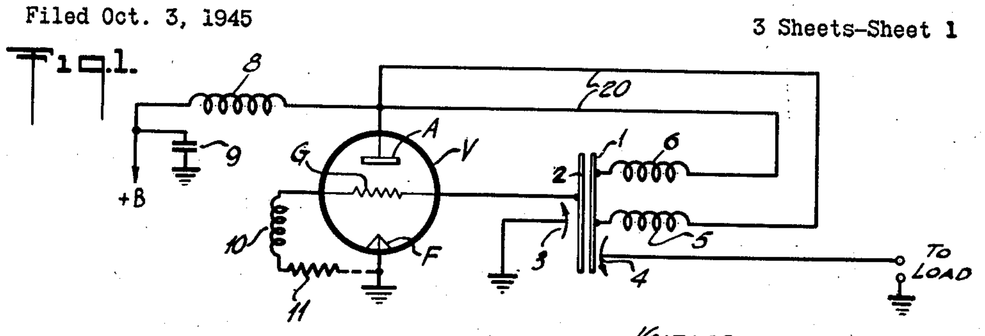
Fig. 1 is a circuit diagram schematically illustrating the equivalent electrical circuit of the invention.

Referring to Fig. 1 in more detail, there is shown a Colpitts type of oscillator circuit comprising a vacuum tube V having an anode A, a grid G, and a filament F. The anode A is connected, by way of leads 20, to line elements 5, 6 and 1 which act as inductances at the operating frequency. Element 6 and element 1 together comprise a resonant line which is shorter than one-quarter wavelength at the operating frequency, thus performing the function of an inductor. Similarly, element 5 together with element 1 also comprises a resonant line which is shorter than one-quarter wavelength at the operating frequency and performs the function of an inductor.

Plate 1, in conjunction with plate 2, performs the function of a blocking capacitor. Plate 2 is connected to the grid G. Plate 3, in conjunction with plate 2, forms a variable capacitor for varying the grid excitation. Plate 3, it should be noted, is variable in position relative to plate 2 and is connected to ground or to the filament which is also grounded. Plate 4, in conjunction with plate 1, forms a variable capacitor serving as one way of abstracting output energy and supplying this output energy from the oscillator to the load. Plate 4 is variable relative to plate 1. The grid G is connected to the filament F through an isolating choke coil 10 and a grid leak resistor 11. The anode is connected to a suitable source of anode polarizing potential here shown as +B through the radio frequency choke coil 8. The anode polarizing potential may be any suitable source of unidirectional potential whose positive terminal is represented by +B. Condenser 9, which is connected to the anode lead, is a by-pass condenser for the operating frequency.

In the operation of the Colpitts oscillator of Fig. 1, the circuit is designed to eliminate any capacity external of the tube between the anode and ground; or, putting it in other words, the necessary capacity between anode and ground is constituted by the interelectrode capacity between the anode and ground. The required capacity between the grid and ground is constituted by the interelectrode capacity between the grid and the filament plus the external variable capacity produced between the plates 2 and 3.

Figures 2, 3:
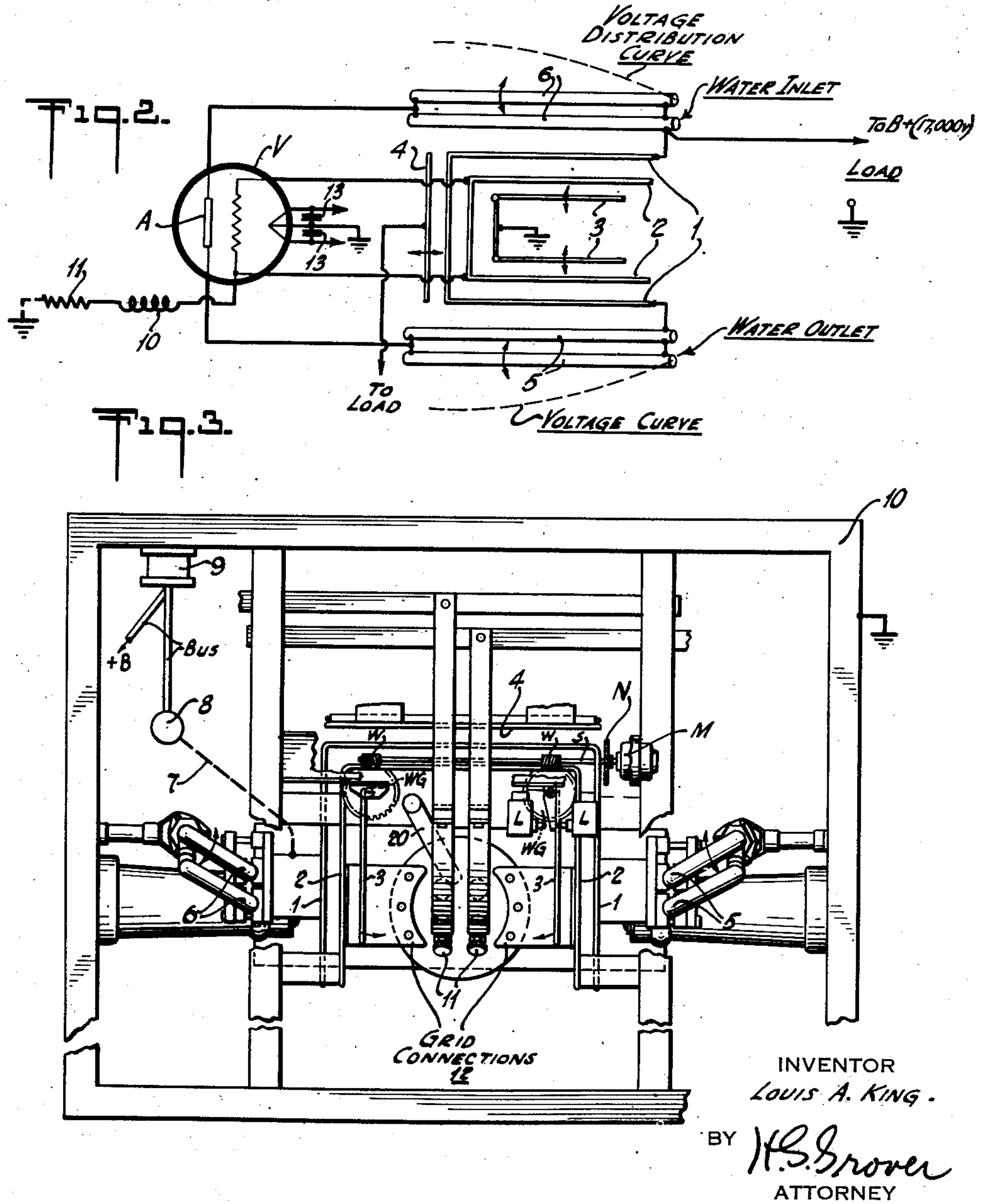
Fig. 2 illustrates in simplified form the mechanical arrangement of the electrical circuit components as used in achieving the results of the invention.
Fig. 3 illustrates a top plan view of the principal components of an actual embodiment of the oscillator of the present invention.

The mechanical details of the lines 5 and 1, and the lines 6 and 1, and the construction of the capacitors formed between the plates 1 and 2 and the plates 3 and 4, respectively, are shown in more detail in Fig. 2. Elements 1, 2 and 3 constitute symmetrically arranged rectangular plates each formed into the shape of a U, and symmetrically nesting one within the other, as shown. The legs of U-shaped member 3 are movable in the direction of the arrows, toward or away from the legs of U-shaped member 2. It will be seen that U-shaped member 3 is maintained at ground potential. Each leg of the U-shaped member 1 is electrically connected to a pair of tubular conductors 6, 6 or 5, 5 and constitutes therewith a resonant transmission line which acts as an inductor at the operating frequency.

The tubular or rod-like conductors 6, 6 are spaced apart from each other and are electrically and physically parallel to each other. These tubular conductors 6, 6 are electrically connected to plate 1 and constitute a resonant transmission line short-circuited at one end and open at the other. One tubular conductor 6 is movable relative to the other tubular conductor 6 in the direction of the arrows in order to enable changing the effective inductance of the resonant transmission line 6, 6, 1. Similarly, tubular or rod-like conductors 5, 5 are spaced apart from each other and electrically and physically parallel to each other. These tubular conductors 5, 5 are electrically connected to plate 1 and constitute a resonant transmission line short-circuited at one end and open at the other. One tubular conductor 5 is movable relative to the other tubular conductor 5 in the direction of the arrows, in order to enable changing the effective inductance of the resonant transmission line 5, 5, 1. The voltage distribution curves on transmission lines 6, 6, 1 and 5, 5, 1 are shown substantially by the curved dash lines which are suitably labeled. The anode A is connected from opposite sides to the tubular conductors 6 and 5 (as shown) in order to form a symmetrical arrangement.

Output to the load is taken from plate 4 which is movable in the direction of the arrow relative to the base of U-shaped member 1. For cooling purposes, the tubes 6, 6 form at one end a water inlet for cooling the anode jacket. Similarly, the tubular conductors 5, 5 form a water outlet for the anode jacket. The B+ supply is connected to the low potential end of tubular conductors 6, 6.

Figure 4:
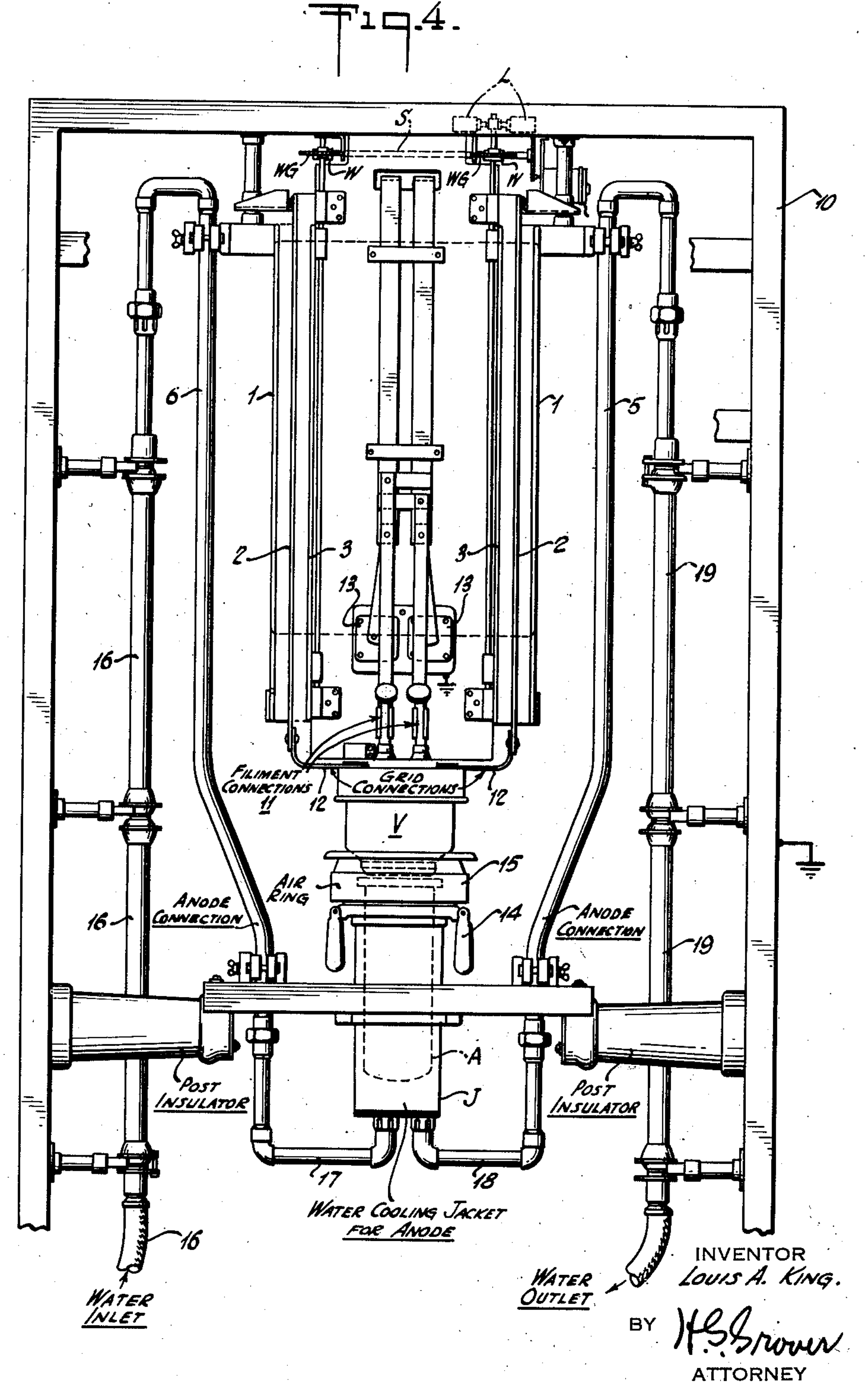
Fig. 4 illustrates a front elevation view of the apparatus of Fig. 3.
Figure 5:
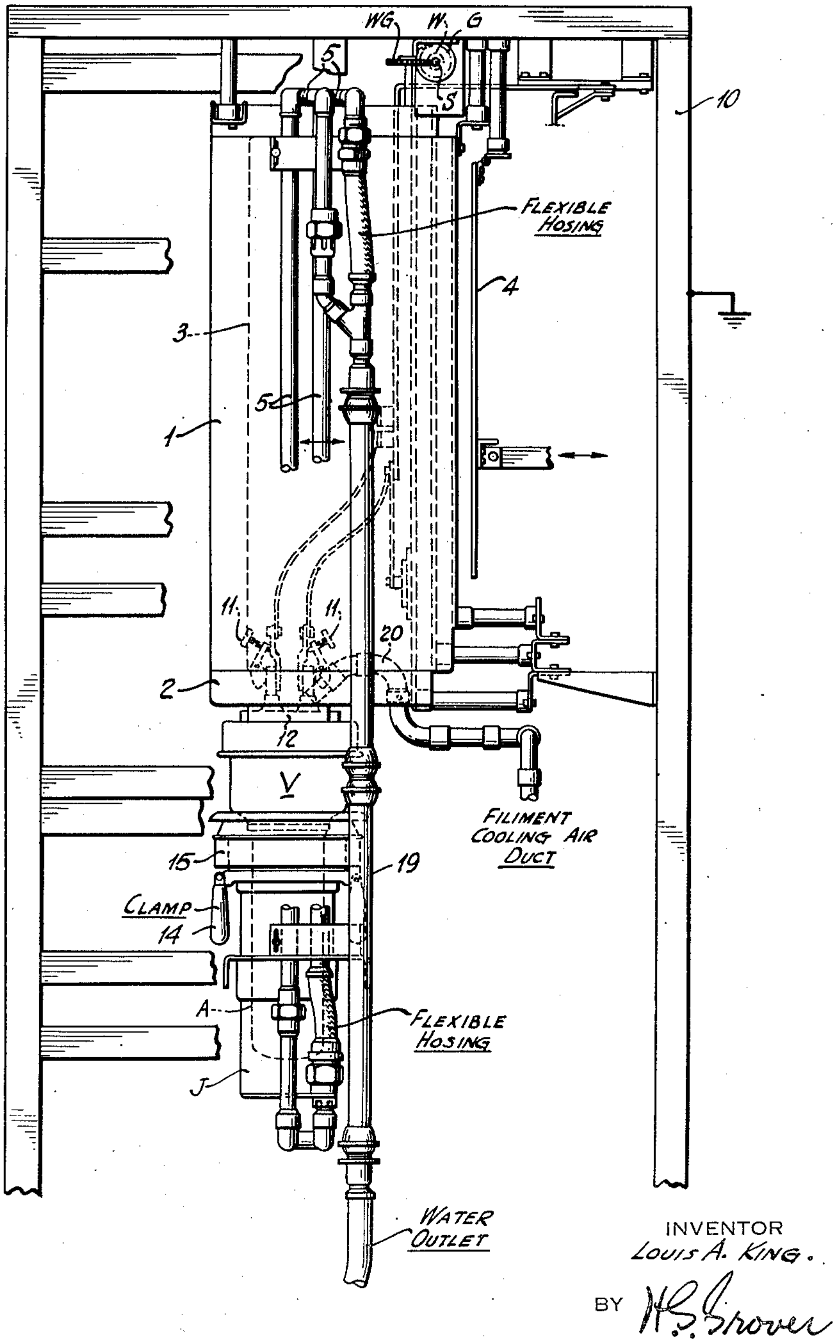
Fig. 5 illustrates the right side elevation view of the apparatus of Fig. 3.

Referring to Figs. 3, 4 and 5, it should be noted that the apparatus is mounted on a grounded metallic frame 10. The grid of the vacuum tube V is connected by way of arcuate-shaped grid connections 12 to the legs of the U-shaped member 2. These grid connections 12, it should be noted, are short and have wide surface areas and are symmetrically arranged on both sides of the vacuum tube, thus minimizing the inductance of the lead connections and providing substantially uniform current distribution around the grid seal. The U-shaped member 3 has its legs pivotally mounted at its base, both legs being movable toward or away from the adjacent legs of U-shaped member 2 for varying the grid excitation. Movement of the legs of the U-shaped member 3 either adds to or subtracts from the capacitive reactance between the grid and ground of the oscillator circuit. The legs of U-shaped member 3 are moved by means of individual worm gears WG, in turn controlled by individual worms W mounted on the same shaft S and controlled from a motor M through a gear N. Limiting stops L, L are provided for limiting the movement of the legs of the U-shaped member 3. In this way the legs of U-shaped member 3 are movable simultaneously toward or away from each other to the same extent. The plate 4, it should be noted, is hinged at its top edge for movement toward or away from the base of U-shaped member 1, and this movement is accomplished by means of a motor (not shown).

In Fig. 3, the movement of one of the tubular conductors 6 with respect to the other tubular conductor 6, and the movement of one of the tubular conductors 5 with respect to the other tubular conductor 5, is indicated by the double arrow designation. The by-pass condenser 9 is shown as a porcelain enclosed type having metal caps, one of which is directly connected to the grounded framework 10 while the other is connected to the high voltage terminal +B and also to one terminal of radio frequency choke coil 8 by way of bus connections. The other terminal of choke coil 8 is shown connected via an electrical connection, indicated by the dash line 7, to that bar which electrically connects tubular conductors 6, 6 to and mechanically supports these tubular conductors from one leg of U-shaped member 1. In practice, electrical connection 7 may be a length of copper tubing.

The cooling system is shown in more detail in Figs. 4 and 5. Cooling water is supplied to the insulating water columns 16 and divides in a Y arrangement at the top of the water columns 16 in order to flow in the same direction through both tubular conductors 6. The bottom of tubular conductor 6 is provided with another Y for enabling the water to join for single entry into the tube 17 before passing into the anode jacket J. The water in jacket J serves to cool the anode A of vacuum tube V. The exhaust or outlet water path from jacket J is identical to the inlet water path with the exception that the water flows in an opposite direction through tube 18, through tubular conductors 5 in parallel, and through insulating outlet water columns 19.

In Fig. 4, is should be noted that one of the tubular conductors 6 and one of the tubular conductors 5 is hidden by the other similarly numbered tubular conductor.

The filaments of the vacuum tube V are supplied with heating current through filament connection 11. Condensers 13, 13 are filament by-pass condensers. The vacuum tube is clamped to the jacket J by means of clamp 14. In order to cool the anode seal between the glass and the metal, there is provided an air ring 15 which gives uniform distribution of air over this seal. The blower which supplies the cooling air to this ring 15 is not shown. Cooling air for the filament seals is provided by means of duct 20 shown in Figs. 3 and 5.

Advantages of the present invention are: (1) The symmetrical arrangement of the anode and grid connections enables uniform radio frequency current distribution around the anode and grid seals of the vacuum tube. (2) The water cooling connection is joined to the anode circuit at a low potential point, thus minimizing power loss in the water cooling circuit. (3) By arranging the tubular conductors 6, 6 and 5, 5 very close to the anode of the vacuum tube, and by using short grid connections 12 of relatively wide surface areas, the inductance in the connections between the anode and grid electrodes and their associated circuit elements is reduced to an absolute minimum. (4) The arrangement of the output plate 4 isolates the output circuit from direct current power supply in the oscillator and thus eliminates direct current power loss in the load circuit while at the same time permitting a variable adjustment of the coupling between the load and the oscillator. (5) The physical arrangement of components is such that there is maximum ease in replacing the vacuum tube V. (6) Frequency adjustment for the oscillator is obtained in simple manner by varying the relative spacing between the two conductors 6, 6 and/or the relative adjustment between the two conductors 5, 5, comprising part of the frequency determining circuit. This frequency adjustment between the tubular conductors 6, 6 may be independent of the adjustment of the tubular conductors 5, 5. Either of the conductors 6 or 5, or both, can be used to give a desired range of adjustment over a desired frequency range of operation of the oscillator.

By way of example only, the vacuum tube V may be an RCA type 9-C-21, and the B+ direct current anode supply will be 11,000 volts. The oscillator may operate at 27 megacycles and provide a power output of 50 kilowatts.

Although the output has been shown coupled to the plate 4, which is a preferred arrangement, it should be understood that if desired this plate 4 may be eliminated and that output may be obtained by tapping the connection along the length of either pair of conducting rods 6, 6 or 5, 5 to provide a wide range of output voltage adjustments. For example, assuming that the voltage on the rods 6, 6 varies from 3,000 to approximately 10,000 volts alternating current, then an output voltage can be obtained anywhere over this range depending upon the tapping point of the output circuit on these rods. This may be a desirable feature when the system is used for heating dielectric materials, inasmuch as the low power factor of the dielectric material is involved.

What is claimed is:

1. In an electron discharge device oscillation generator having a frequency determining circuit, said circuit including an inductance comprising a pair of spaced, substantially equal length rod-like conductors which are physically parallel, means connecting the effective portions of said rod-like conductors in electrically parallel relation, and a metal sheet arranged physically parallel to and substantially equally distant from both said rod-like conductors, a connection from said pair of rod-like conductors to a point at or near one end of said sheet, one of said rod-like conductors being movable relative to the other rod-like conductor for enabling frequency adjustment.

2. An electron discharge device oscillation generator having a frequency determining circuit, said circuit including an inductance comprising a pair of spaced, substantially equal length rod-like conductors which are physically and electrically parallel, and a metal sheet arranged physically parallel to and substantially equally distant from both said rod-like conductors, a connection from said pair of rod-like conductors to said sheet near one end thereof, and means for tuning said frequency determining circuit comprising a grounded plate capacitively coupled and movable relative to said sheet.

3. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, the legs of said innermost U-shaped conductor being movable toward or away from the legs of the central U-shaped conductor, and means for simultaneously moving said legs of the innermost U-shaped conductor to thereby vary the capacity between said last two U-shaped conductors, a vacuum tube having a pair of non-thermionic electrodes, a connection from one of the electrodes to the central U-shaped conductor, and a connection from the other of said electrodes to the outermost U-shaped conductor.

4. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, a vacuum tube having an anode, a grid and a cathode, a connection from said anode to the outermost U-shaped conductor, a connection from said grid to the central U-shaped conductor, and a connection from said cathode to ground.

5. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, a vacuum tube oscillator having an anode, a grid and a cathode, a connection from said anode to the outermost U-shaped conductor, a connection from said grid to the central U-shaped conductor, and a connection from the cathode to ground, the legs of said outermost U-shaped conductor comprising parts of symmetrically arranged inductors in circuit with said oscillator.

6. The combination as defined in claim 5, wherein the connection from said anode to the outermost U-shaped conductor includes a pair of spaced, substantially equal length rod-like conductors which are physically and electrically parallel and connected near one end to a leg of the outermost U-shaped conductor.

7. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, a vacuum tube having an anode, a grid and a cathode, a connection from said anode to the outermost U-shaped conductor, a connection from said grid to the central U-shaped conductor, a connection from said cathode to ground, and means for deriving energy from said vacuum tube comprising a plate capacitively coupled to the base of said outermost U-shaped conductor.

8. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor to thereby vary the capacity between said last two U-shaped conductors, a vacuum tube having an anode, a grid and a cathode, symmetrical connections from said anode to correspondingly located points on the outermost U-shaped conductor, symmetrical connections from said grid to correspondingly located points on the central U-shaped conductor, and a connection from said cathode to ground.

9. In combination, three spaced U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, a vacuum tube oscillator having an anode, a grid and a cathode, a connection from said anode to the outermost U-shaped conductor, a connection from said grid to the central U-shaped conductor, and a connection from the cathode to ground, the legs of said outermost U-shaped conductor comprising parts of symmetrically arranged inductors in circuit with said oscillator; each of said inductors including a pair of spaced, substantially equal length tubular conductors which are physically and electrically parallel and connected near one end to a leg of the outermost U-shaped conductor, a conduit between the tubular conductors of said inductors, means for supplying cooling fluid to the tubular conductors of one of said inductors at a low potential point, and means for abstracting said cooling fluid from the other of said inductors also at a low potential point.

10. A radio frequency electron discharge device oscillator having a frequency determining circuit, said circuit including two symmetrically arranged inductors on opposite sides of said device, each of said inductors comprising a pair of spaced, substantially equal length rod-like conductors which are physically and electrically parallel, and a metal sheet arranged physically parallel to and substantially equally distant from both said rod-like conductors, a connection from said pair of rod-like conductors to a point on said sheet near one end therefor, a direct conductive connection between the metal sheets of said two inductors, and means of relatively wide surface area for connecting said two inductors symmetrically to the output electrode of said device, to thereby cause radio frequency current to flow substantially uniformly around said output electrode.

11. An electron discharge device generator having a frequency determining circuit which includes a resonant transmission line, the inductance of said line comprising a pair of spaced, substantially equal length rod-like conductors which are physically parallel to each other, said conductors having a length approximately equal to an odd multiple including unity of a quarter wavelength at the operating frequency, a direct connection including a flexible coupling between said rod-like conductors at both ends, to thereby enable the spacing between said conductors to be varied and hence the inductance of said line to be varied, a metal sheet arranged physically parallel to and substantially equally distant from both of said rod-like conductors, and a direct connection from one end of said rod-like conductors to said sheet near one end thereof, whereby said rod-like conductors and said sheet constitute said transmission line having a low potential end at said location of said last direct connection.

12. An electron discharge device generator having a frequency determining circuit which includes a resonant transmission line, the inductance of said line comprising a pair of spaced, substantially equal length rod-like conductors which are physically parallel to each other, said conductors having a length approximately equal to an odd multiple including unity of a quarter wavelength at the operating frequency, a direct connection including a flexible coupling between said rod-like conductors at both ends, to thereby enable the spacing between said conductors to be varied and hence the inductance of said line to be varied, a metal sheet arranged physically parallel to and substantially equally distant from both of said rod-like conductors, and a direct connection from one end of said rod-like conductors to said sheet near one end thereof, whereby said rod-like conductors and said sheet constitute said transmission line having a low potential end at said location of said last direct connection, said rod-like conductors being tubular, and means for supplying to or withdrawing cooling fluid from said tubular conductors at said low potential end.

13. An electron discharge device oscillation generator, comprising three U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, said device having an anode, a grid and a cathode, a connection including an inductor from said anode to the free end of one leg of the outermost U-shaped conductor, a connection including another inductor from said anode to the free end of the other leg of the outermost U-shaped conductor, symmetrical connections from said grid to the central U-shaped conductor, and a connection from said cathode to ground.

14. An electron discharge device oscillation generator, comprising three U-shaped conductors of appreciable surface area and of different size arranged symmetrically relative to each other and nesting one within the other, adjacent U-shaped conductors being capacitively coupled to each other, a connection from ground to the innermost and smallest U-shaped conductor, said innermost U-shaped conductor having legs which are movable relative to the base of the U, means for simultaneously moving the legs of said innermost U-shaped conductor toward or away from the legs of the central U-shaped conductor, to thereby vary the capacity between said last two U-shaped conductors, said device having an anode, a grid and a cathode, a connection including an inductor from said anode to the free end of one leg of the outermost U-shaped conductor, a connection including another inductor from said anode to the free end of the other leg of the outermost U-shaped conductor, symmetrical connections from said grid to the central U-shaped conductor, and a connection from said cathode to ground, each of said inductors together with the leg of the outermost U-shaped conductor to which it is connected comprising a resonant transmission line.

15. An oscillation generator as defined in claim 14, characterized in this, that at least one of said inductors comprises a pair of substantially equal length conductors which are physically and electrically parallel to each other and adjustably spaced from each other.

16. In an electron discharge device oscillation generator, an electron discharge device having a pair of electrodes and a frequency determining circuit coupled therebetween, said circuit including an inductance forming part of a resonant line and comprising a pair of adjustably spaced, substantially equal length and coextensive conductors which are physically parallel, means respectively connecting the corresponding ends of said conductors together, whereby said conductors are in electrically parallel relation, and means coupling said pair of conductors at said ends to said electrodes.

17. A radio frequency electron discharge device oscillator having an anode and a frequency determining circuit connected to said anode, said circuit including symmetrically arranged inductors on opposite sides of said device and extending away from said device in the same direction, each of said inductors comprising a pair of spaced, substantially equal length conductors which are physically parallel and connected at one end of said anode, and a direct connection including a flexible coupling between the conductors of each inductor at both ends thereof to thereby enable the spacing between said conductors to be varied and hence the inductance of said frequency determining circuit to be varied.

LOUIS A. KING.

REFERENCES CITED

The following references are of record in the file of this patent:

UNITED STATES PATENTS

| Number | Name | Date |
|---|---|---|
| 2,036,562 | Bechmann | Apr. 7, 1936 |
| 2,109,843 | Kassner | Mar. 1, 1938 |
| 2,138,181 | Lindenblad | Nov. 29, 1938 |
| 2,153,205 | Park | Apr. 4, 1939 |
| 2,169,305 | Tunick | Aug. 15, 1939 |
| 2,219,648 | Gutton et al. | Oct. 29, 1940 |
| 2,240,060 | Usselman | Apr. 29, 1941 |
| 2,404,640 | Lawrance | July 23, 1946 |
| 2,428,193 | Blewett | Sept. 30, 1947 |